US005482336A

United States Patent [19]
Rouse et al.

[11] Patent Number: 5,482,336
[45] Date of Patent: Jan. 9, 1996

[54] IMPACT RESISTENT FLEXIBLE GRILLE ARRANGEMENT

[75] Inventors: Alan S. Rouse, Clinton Township; Robert Juzwiak, Livonia, both of Mich.; Colin Frost, Dover, N.H.

[73] Assignee: Davidson Textron Inc., Dover, N.H.

[21] Appl. No.: 328,856

[22] Filed: Oct. 25, 1994

[51] Int. Cl.⁶ .................................................. B62D 25/08
[52] U.S. Cl. ........................................... 293/115; 180/68.5
[58] Field of Search .................................. 293/115, 132; 180/68.6

[56] References Cited

U.S. PATENT DOCUMENTS

| | | | |
|---|---|---|---|
| 3,792,889 | 2/1974 | Fuener et al. | 293/115 |
| 4,407,871 | 10/1983 | Eisfeller | 428/31 |
| 4,431,711 | 2/1984 | Eisfeller | 428/31 |
| 4,645,250 | 2/1987 | Bauer et al. | 293/115 |
| 4,713,143 | 12/1987 | Eisfeller | 156/655 |
| 4,753,468 | 6/1988 | Szymczak et al. | 293/132 |
| 4,834,436 | 5/1989 | Nguyen | 293/115 |
| 4,917,203 | 4/1990 | Sacco et al. | 180/68.6 |
| 4,944,540 | 7/1990 | Mansoor et al. | 293/115 |
| 5,205,597 | 4/1993 | Chase | 293/115 |

Primary Examiner—Joseph D. Pape
Attorney, Agent, or Firm—Reising, Ethington, Barnard & Perry

[57] ABSTRACT

An impact resistent flexible grille is located in an impact zone at a front end of an automobile having a grille support structure and an energy absorbing bumper. The flexible grille is rigidly fastened to the grille support structure and the bumper by rigid attachments that are located so that the flexible grille flexes to avoid damage when the front bumper collapses rearwardly responsive to a front end impact. Elastomeric tethers connect deflected portions of the flexible grille to the grille support structure to guide them back to their original position when the bumper returns to its original position. In one arrangement, the rigid attachments are located along a vertical centerline of the flexible grille and an elastomeric tether connects each upper corner of the flexible grille to the grille support structure. In a second arrangement, sides of the flexible grille are rigidly attached to the grille support structure on a horizontal centerline and an upper end of the flexible grille is connected to the grille support structure by a plurality of elastomeric tethers. In a third arrangement, an integral nib of the flexible grille is snapped into an aperture of the bumper and moves forwardly in the aperture of the bumper to accommodate initial movement of the bumper when it collapses rearwardly.

7 Claims, 3 Drawing Sheets

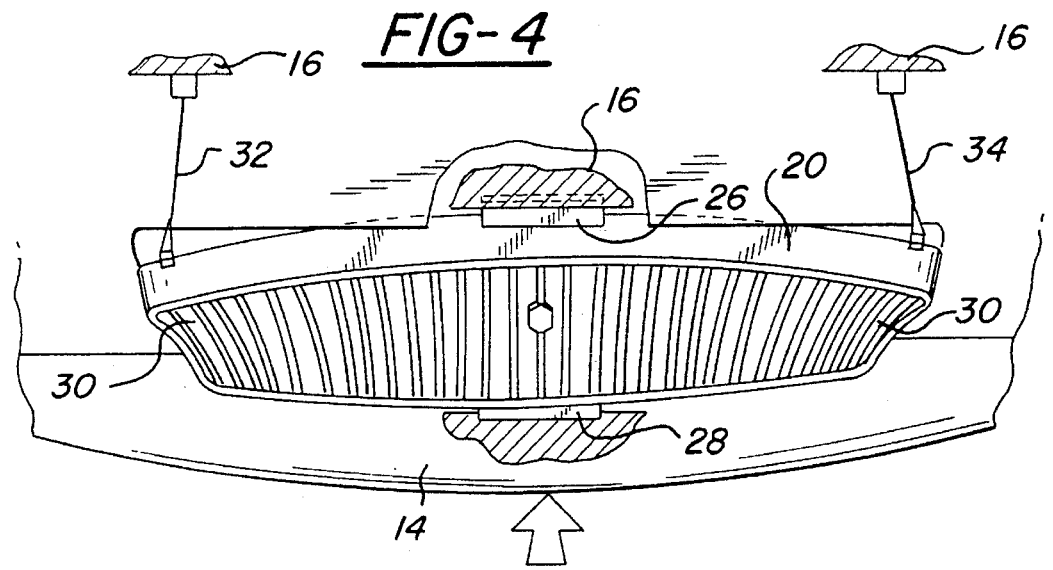
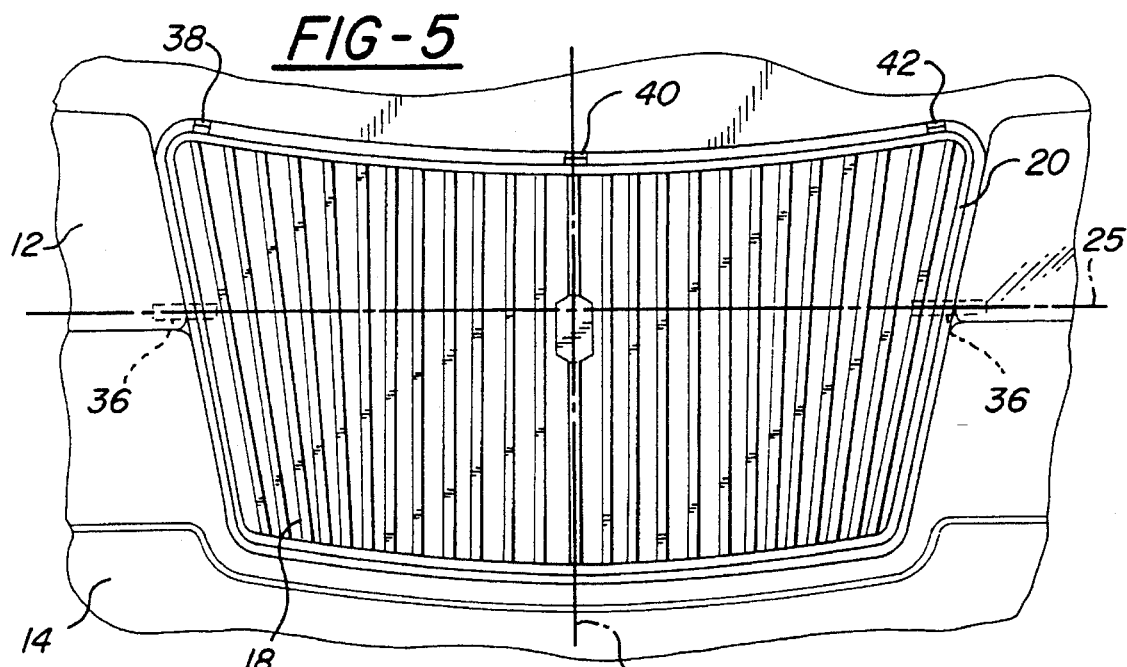
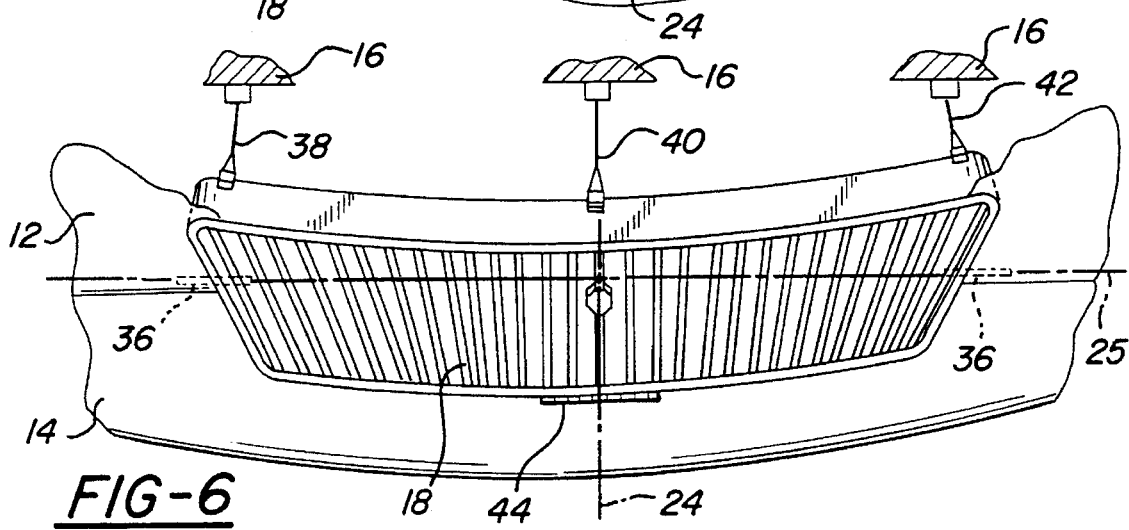

IMPACT RESISTENT FLEXIBLE GRILLE ARRANGEMENT

BACKGROUND OF THE INVENTION

This invention relates generally to automobiles and more particularly to automobiles that have an air intake grille and an energy absorbing bumper at the front end which deflects or moves substantially with respect to the automobile body upon impact.

Automobile bodies conventionally include an air intake grille at the front end for taking air into the engine compartment for absorbing heat from a radiator forming part of the engine cooling system. For many years air intake grilles were rigid structures made of a hard chrome plated metal. However impact resistant flexible grilles having a base structure that is a flexible elastomer such as thermoplastic urethane and the appearance of an electrodeposited chrome part are now known. See for instance U.S. Pat. Nos. 4,407,871; 4,431,711 and 4,713,143 that are assigned to the assignee of this invention.

Automobile bodies also now typically include an energy absorbing bumper at the front end to avoid damage in minor front end collisions. These bumpers deflect or move substantially rearwardly with respect to the front end of the automobile in response to front end impacts up to a predetermined magnitude and then recover when the front end impact load is removed. For example, these energy absorbing bumpers may move as much as 3 or 4 inches with respect to the facia panel at the front end of the automobile.

U.S. Pat. No. 4,645,250 recognizes advantages of a two-part bumper grille arrangement in which the grille is attached to the bumper particularly if the attachment is achieved easily. However, the patent does not specify if the bumper is an energy absorbing type nor does the patent indicate how the travel of an energy absorbing bumper might be accommodated.

On the other hand, in known energy absorbing bumper arrangements, the grille is not attached to the bumper so that the grille does not sustain any damage when the bumper collapses in response to a front end impact.

For example, U.S. Pat. Nos. 4,753,468; 4,834,436; and 4,944,540; all disclose grille mounting arrangements where the grille is mounted so that it moves when the bumper retracts and none of the moveable grills are fastened to the energy absorbing bumper. But U.S. Pat. No. 4,944,540 does show an arrangement in FIGS. 5 and 6 where the grille has a lower pocket for receiving an upper surface of the bumper to direct contact of the collapsing bumper with the grille.

U.S. Pat. No. 4,917,203 shows another grille mounting arrangement where the grille is fastened to an engine hood by a flexible U-shaped frame to permit a yielding movement in case of collisions. The lower end of the frame projects into a recess of the bumper, but the frame is not fastened to the bumper in any manner.

U.S. Pat. No. 5,205,597 discloses an impact resistent flexible grille that is rigidly attached to the forward hood structure of an automobile along an upper support member and vertical supports. The flexible grille deflects in response to a front end collision but the flexible grille is not fastened to the bumper in any manner.

SUMMARY OF THE INVENTION

The object of this invention is to provide a two-part bumper grille arrangement in which an impact resistant flexible grille is attached to a collapsible energy absorbing bumper.

A feature of the invention is that the impact resistant flexible grille is rigidly attached to the bumper so that it deflects in response to front end collision to avoid damage Another feature of the invention is that the impact resistent flexible grille has deflectable portions that are connected to the grille by elastomeric tethers that return the deflectable portions to their proper position when the impact load is removed.

Still another feature of the invention is that the impact resistent flexible grille may be attached to the bumper easily by integral portions of the grille.

Still, yet another feature of the invention is that the impact resistent flexible grille may be rigidly attached to the grille by a lost motion attachment that accommodates an initial phase of the bumper movement.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 4 is another top view of the automobile front end that is shown in FIG. 1;

FIG. 5 is a front view of an automobile front end that is equipped with a flexible grill in accordance with another embodiment of the invention;

FIG. 6 is a fragmentary top view of the automobile front end that is shown in FIG. 5;

DESCRIPTION OF THE INVENTION

Figure 1:
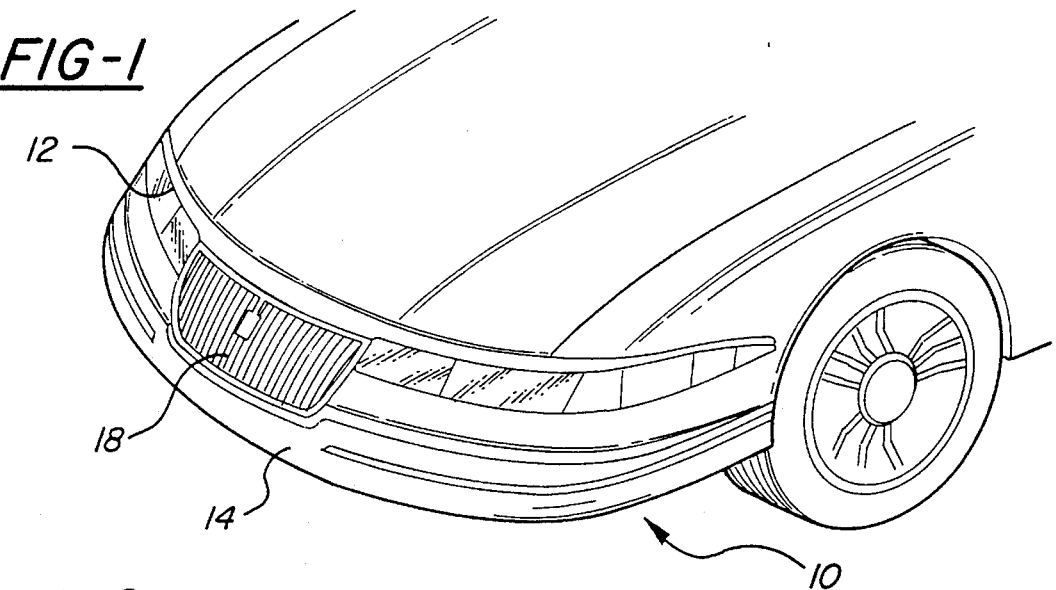
FIG. 1 is a perspective view of automobile front end that is equipped with a flexible grill in accordance with the intention.
Figure 2:
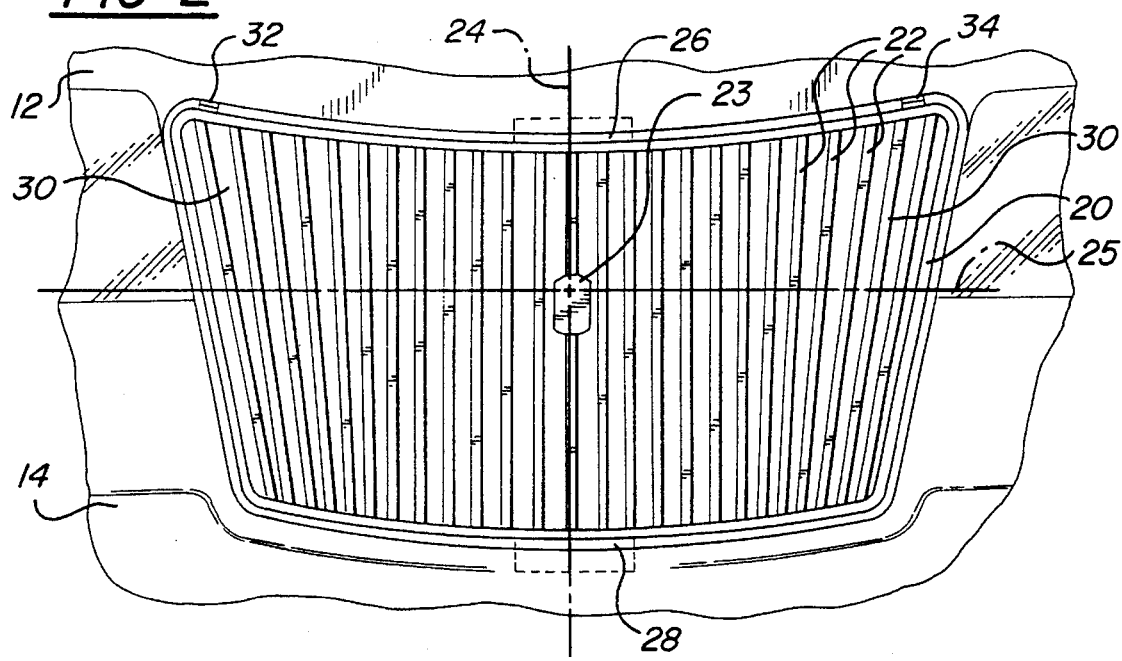
FIG. 2 is a front view of the automobile front end that is shown in FIG. 1.
Figure 3:
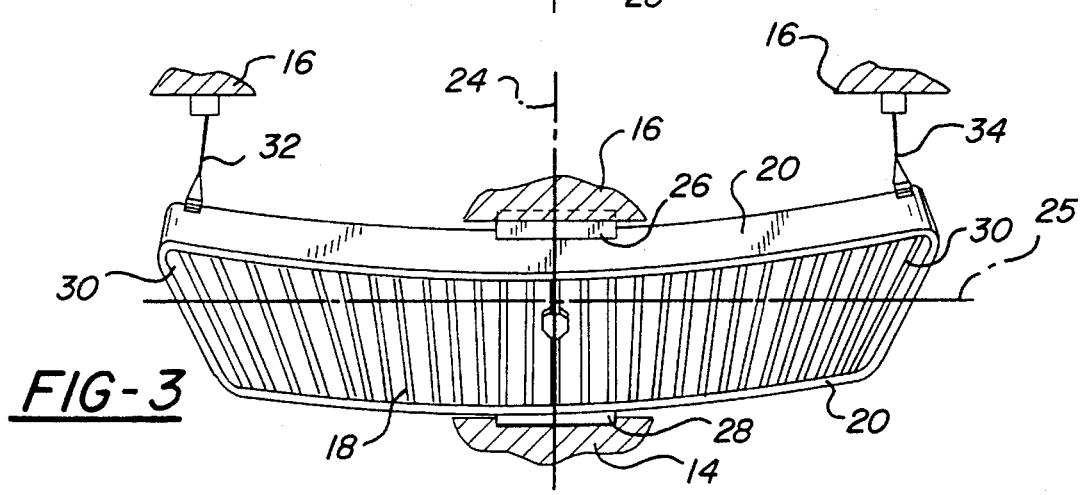
FIG. 3 is a fragmentary top view of the automobile front end that is shown in FIG. 1.
Figure 7:
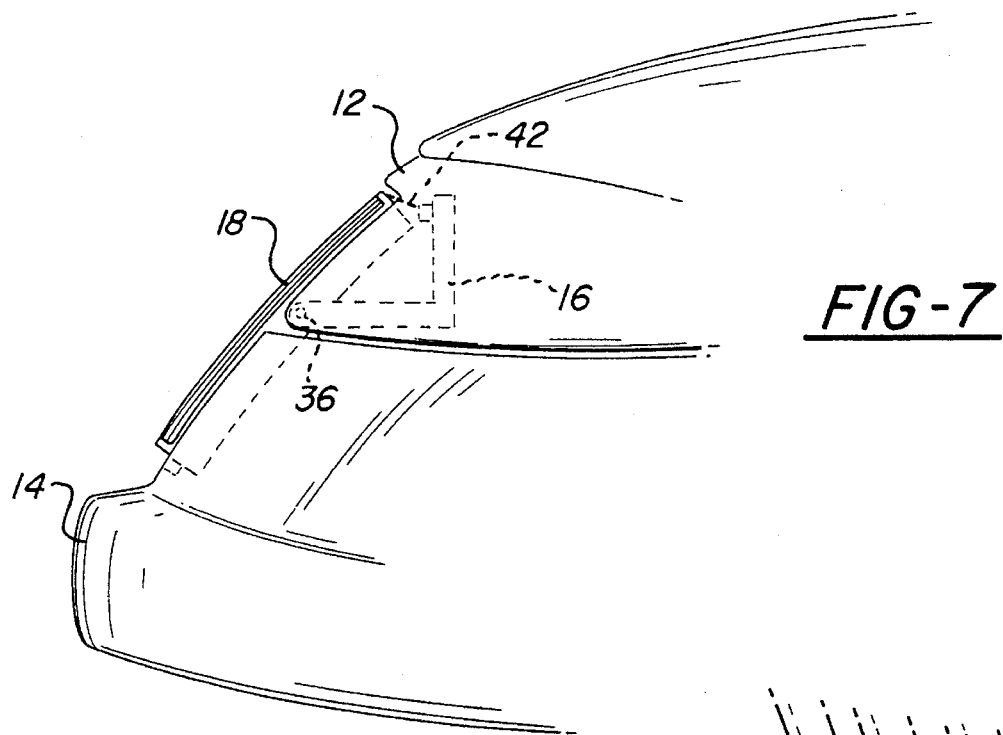
FIG. 7 is a side view of the automobile front end that is shown in FIG. 5.

Referring now to the drawing and more particularly to FIGS. 1–4, the front end of an automobile is indicated generally at 10. The front end 10 conventionally includes a facia panel 12 and a front bumper 14 located below the facia panel 12. The facial panel 12 is typically secured to body structure 16 behind the facia panel in a substantially non-moveable manner. The front bumper 14 on the other hand, is an energy absorbing bumper that is typically secured to the body structure 16 so that it collapses rearwardly in response to front end impacts up to a predetermined limit to avoid damage in minor accidents.

The front end 10 also typically includes a grille 18 which is often located in the impact zone at the front end of the automobile, particularly, when the grille 18 is mounted flush with the facia panel 12 which in turn is contiguous with the face of the front bumper 14 as best shown in FIG. 1.

The grille 18 is an impact resistant flexible grille 18 of the type that is described in the three patents that are assigned to the assignee of this invention and identified in the foregoing background of the invention. Briefly, the impact resistant flexible grille 18 comprises a soft flexible substrate, for instance, a thermoplastic elastomer (TPE) such as thermoplastic urethane (TPU) or thermoplastic polyolefin (TPO) that is vacuum metalized and top coated to give the appearance of electrodeposited chrome.

This invention is directed to an arrangement for attaching the impact resistant flexible grille 18 to the front end 10 of the automobile which as indicated above has an energy absorbing front bumper 14 that collapses rearwardly and then returns to its original position in response to front end impacts up to a predetermined limit.

The flexible grille 18 is convex in the forward facing direction and comprises a generally quadrilateral frame 20 having a plurality of laterally spaced, generally vertical slats 22 that are attached to the top and bottom members of the frame. The middle slat carries an emblem 23 that is located near the intersection of a generally vertical centerline 24 and a horizontal centerline 25 that is located between the top and bottom members of the frame 20.

The flexible grille 18, which is symmetrical about the generally vertical centerline 24, is rigidly fastened to the front end 10 at this centerline 24. More particularly, the top member of the frame 20 for the flexible grille 18 is rigidly fastened to the body structure 16 or other grille support structure, such as the facia panel 12 itself, by a rigid attachment 26 located at the centerline 24. On the other hand, the bottom member of the frame 20 is rigidly fastened to the collapsible front bumper 14 which moves relative to the grille support structure when it collapses. The bottom member is rigidly fastened by a rigid attachment 28 which is also located at the centerline 24. The rigid attachments 26 and 28 which are shown schematically may take the form of a screw and J-nut, rivet, or any other suitable rigid attachment, This attachment arrangement enables the flexible grille 18 to accommodate the rearward collapse of the front bumper 14 in response to a front impact so that neither the flexible grille 18 nor the front bumper 14 sustain any damage in minor accidents, such as those that would occur in a five mile per hour front end collision. More particularly the flexible grill 18 flexes so that side wing portions 30 of the flexible grille 18 deflect away from the facia panel 12 or other grille support structure to avoid damage when the front bumper collapses rearwardly.

The mounting arrangement is further enhanced by tensioning devices, such as elastomeric tethers 32 and 34 that attach the respective upper corners of the flexible grille 18 to the grille support structure. These elastomeric tethers 32 and 34 have several functions. Firstly, the elastomeric tethers 32 and 34 are tensioned slightly when installed so that the elastomeric tethers 32 and 34 assist in accurately locating the flexible grille 18 in an aesthetically pleasing and aerodynamically efficient flush mounted position with respect to the facia panel 12. After installation, when the front bumper collapses rearwardly in response to a front impact load as shown in FIG. 4, the elastomeric tethers 32 and 34 stretch elastically to accommodate substantial deflection of side wing portions 30 of the flexible grille 18 away from the facia panel 12 and any other grille support structure. The elastomeric tethers 32 and 34 then guide and return the side wing portions 30 back to their original flush position with respect to the facia panel 12 when the front bumper 14 returns to its original position after the front impact load is removed.

Referring now to FIGS. 4–8, another arrangement for attaching the flexible grille 18 is shown. In this second arrangement, the flexible grille 18 is fastened to the grille support structure by a rigid attachment located on the generally horizontal centerline 25 of the flexible grille 18 and a plurality of elastomeric tethers fasten an upper end of the flexible grille 18 to the grille support structure.

Figure 8:
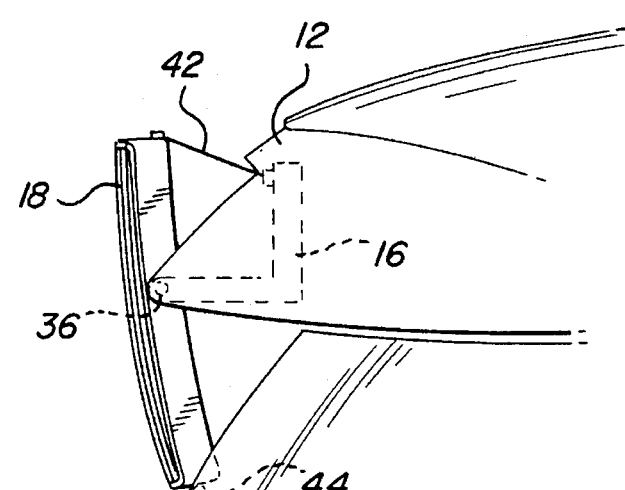
FIG. 8 is another side view of the automobile front end that is shown in FIG. 5.

More particularly, the side members of the frame 20 are rigidly attached to the body structure 16 that supports facia panel 12 by a rigid attachment in the form of pivot pins 36 located on the generally horizontal centerline 25 of the flexible grille 18 while the top member of the frame 20 is attached to the body structure 16 by a plurality of laterally spaced elastomeric tethers 38 40 and 42 located at the vertical centerline 24 and the respective upper corners of the flexible grille 18. The bottom member of the frame 20 is rigidly attached to the collapsible front bumper 14 by a rigid attachment 44 at the generally vertical centerline 24. However, in this instance the rigid attachment 44 accommodates pivotal movement between the bottom of the frame 20 and the collapsible front bumper 14. With this second arrangement, the flexible grille 18 flexes and pivots about the horizontal centerline 25 when the front bumper 14 collapses rearwardly in response to a front end impact and thus the entire upper portion of the flexible grille 18 deflects and/or moves away from the facia panel 12 and body structure 16 to avoid damage when the front bumper 14 collapses rearwardly as shown in FIG. 8. In this case the three elastomeric tethers 38, 40 and 42 connecting the upper end of the flexible grille 18 to the grille support structure 16 are initially tensioned for accurate flush mounting of the flexible grille 18 and then stretched when the upper portion of the flexible grille 18 deflects away from the grille support structure to guide and return the upper end of the flexible grille 18 back to its original flush position when the collapsed bumper 14 returns to its original position.

Figure 9:
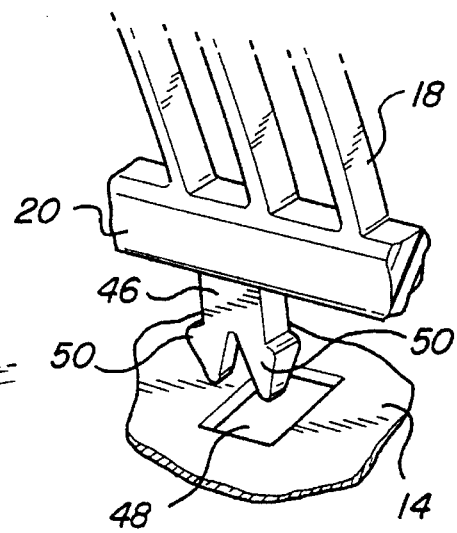
FIG. 9 is a fragmentary perspective view of an automobile front end that is equipped with a flexible grill in accordance with a third embodiment of the invention.

Another arrangement for attaching the flexible grille 18 is shown in FIG. 9. In this third arrangement, the flexible grille 18 is fastened to the collapsible front bumper 14 by a rigid attachment in the form of an integral nib 46 of the flexible grille 18 that has a resilient bifurcated body with integral wings 50 that is snapped into a slot 48 of the front bumper 14. This clamps an upper wall of the bumper 14 between the wings 50 of the integral nib 48 and the lower member of the frame 20 so that the grille 18 is rigidly fastened to the bumper 14. Moreover, the slot 48 is preferably elongated in the longitudinal direction of the automobile so that the integral nib 44 moves forwardly in the slot 48 (that is, toward the right as viewed in FIG. 9) to accommodate initial movement of the front bumper 14 when it collapses rearwardly in response to front end impacts. The rigid, lost motion attachment comprising the integral nib 46 and elongated slot 48 has several advantages including an easily achieved attachment of the flexible grille 18 to the bumper 14 and elimination of separate fastening elements. The integral nib 46 may be located on the generally vertical centerline 24 and used in place of the rigid attachment 28 of the arrangement shown in FIGS. 1–4 or the rigid attachment 44 shown in FIGS. 5–8.

In other words the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. An arrangement for attaching a impact resistant flexible grille in an impact zone at a front end of an automobile having a grille support structure at the front end and an energy absorbing bumper at the front end that collapses rearwardly and then returns to its original position with respect to the grille support structure in response to front end impacts up to a predetermined limit, the arrangement comprising:

a first rigid attachment fastening the flexible grille to the grille support structure, a second rigid attachment fastening the flexible grille to the bumper, the first and second rigid attachments being located so that the flexible grille flexes and an unfastened portion of the flexible grille deflects away from the grille support structure to avoid damage when the front bumper collapses rearwardly, and at least one elastomeric tether connecting the unfastened portion of the flexible grille to the grille support structure so the elastomeric tether stretches elastically when the unfastened portion of the flexible grille deflects away from the grille support structure so as to guide and return the unfastened portion of the flexible grille back to its original position with respect to the grille support structure when the bumper returns to its original position.

2. The arrangement for attaching an impact resistant flexible grille as defined in claim 1 wherein the first and second rigid attachments are located along a generally vertical centerline of the flexible grille and an elastomeric tether fastens each upper corner of the flexible grille to the grille support structure.

3. The arrangement for attaching a flexible grille as defined in claim 1 wherein the first rigid attachment is located on a generally horizontal centerline of the flexible grille and a plurality of elastomeric tethers connect an upper end of the flexible grille to the grille support structure.

4. The arrangement for attaching a flexible grille as defined in claim 1 wherein the second rigid attachment comprises an integral nib of the flexible grille that is snapped into an aperture of the bumper.

5. The arrangement for attaching a flexible grille to as defined in claim 4 wherein the nib of the flexible grille is snapped into an elongated aperture of the bumper so that the nib moves forwardly in the elongated aperture to accommodate initial movement of the bumper when the bumper collapses rearwardly in response to front end impacts.

6. An arrangement for attaching a impact resistant flexible grille having a generally vertical centerline in an impact zone at a front end of an automobile having a grille support structure at the front end and an energy absorbing bumper at the front end that collapses rearwardly and then returns to its original position with respect to the grille support structure in response to front end impacts up to a predetermined limit, the arrangement comprising:

a first rigid attachment fastening an upper end of the flexible grille to the grille support structure at a generally vertical centerline of the grille, and a second rigid attachment fastening a lower end of the flexible grille to the bumper at the generally vertical centerline so that the flexible grille flexes and side wing portions of the flexible grille deflect away from the grille support structure to avoid damage when the front bumper collapses rearwardly, and elastomeric tethers connecting each upper corner of the flexible grille to the grille support structure which are stretched elastically when the side wing portions of the flexible grille deflect away from the grille support structure so as to guide and return the side wing portions of the flexible grille back to their original position with respect to the grille support structure when the bumper returns to its original position.

7. An arrangement for attaching a impact resistant flexible grille having a generally vertical centerline and a generally horizontal centerline in an impact zone at a front end of an automobile having a grille support structure at the front end and an energy absorbing bumper at the front end that collapses rearwardly and then returns to its original position with respect to the grille support structure in response to front end impacts up to a predetermined limit, the arrangement comprising:

a first rigid attachment located on the generally horizontal centerline of the flexible grille fastening the flexible grille to the grille support structure, and a second rigid attachment fastening a lower end of the flexible grille to the bumper so that an upper portion of the flexible grille deflects and/or moves away from the grille support structure to avoid damage when the front bumper collapses rearwardly, and a plurality of elastomeric tethers connecting the upper end of the flexible grille to the grille support structure which are stretched elastically when the upper portion of the flexible grille deflects and/or moves away from the grille support structure so as to guide and return the upper end of the flexible grille back to its original position with respect to the grille support structure when the bumper returns to its original position.

* * * * *